United States Patent [19]
Levitsky et al.

[11] Patent Number: 5,585,174
[45] Date of Patent: Dec. 17, 1996

[54] HEAT-ACCUMULATING MATERIAL AND USE THEREOF

[75] Inventors: Emmanuil A. Levitsky; Valentin N. Parmon; Ella M. Moroz; Sergei V. Bogdanov; Nina E. Bogdanchikova; Olga N. Kovalenko, all of Novosibirsk, Russian Federation

[73] Assignees: Institut Kataliza Sibirskogo Otdelenia Rossiiskoi Akademii Nauk; Aktsionernoe Obschestvo Zakrytogo Tipa "Ekoterm", both of Novosibirsk, Russian Federation

[21] Appl. No.: 410,401

[22] Filed: Mar. 27, 1995

Related U.S. Application Data

[63] Continuation of Ser. No. 39,185, filed as PCT/SU91/00173 Aug. 26, 1991, abandoned.

[51] Int. Cl.$^6$ .................... B32B 3/26; C09K 5/06; F28D 15/00

[52] U.S. Cl. ............ 428/307.7; 106/813; 165/104.12; 165/104.13; 165/104.21; 165/905; 165/920; 252/70; 252/604; 252/610; 428/308.4; 428/312.2; 428/315.9; 428/913

[58] Field of Search .................... 106/38.3, 813; 165/104.11–104.13, 104.21, 905, 920; 252/70, 3, 604, 605, 609, 610; 428/312.2, 331, 315.9, 307.3, 307.7, 913, 308.4

[56] References Cited

U.S. PATENT DOCUMENTS

| | | | |
|---|---|---|---|
| 2,882,243 | 4/1959 | Milton | 252/455 |
| 4,277,357 | 7/1981 | Boardman | 252/70 |
| 4,447,347 | 5/1984 | Goldfarb et al. | 252/70 |
| 4,484,617 | 11/1984 | Sizmann | 165/104.12 |
| 4,708,812 | 11/1987 | Hatfield | 252/70 |

FOREIGN PATENT DOCUMENTS

| | | |
|---|---|---|
| 3132793 | 2/1981 | Germany . |
| 3413169 | 9/1985 | Germany . |
| 1584559 | 7/1982 | United Kingdom . |

*Primary Examiner*—Marion E. McCamish
*Assistant Examiner*—Blaine R. Copenheaver
*Attorney, Agent, or Firm*—Ladas & Parry

[57] ABSTRACT

Disclosed is a heat-accumulating material comprising a thermally inert matrix which is an open-porosity substance, and a thermosensitive working substance which is a hygroscopic substance capable of reversible dehydration-hydration processes. A heat-accumulating material according to the present invention is intended for the use as a cooling and heating agent for a gas/air atmosphere, a thermostating agent, and as protection against heating of articles and building constructions, for example radio-electronic devices, as well as as a means for fire extinguishing.

15 Claims, 1 Drawing Sheet

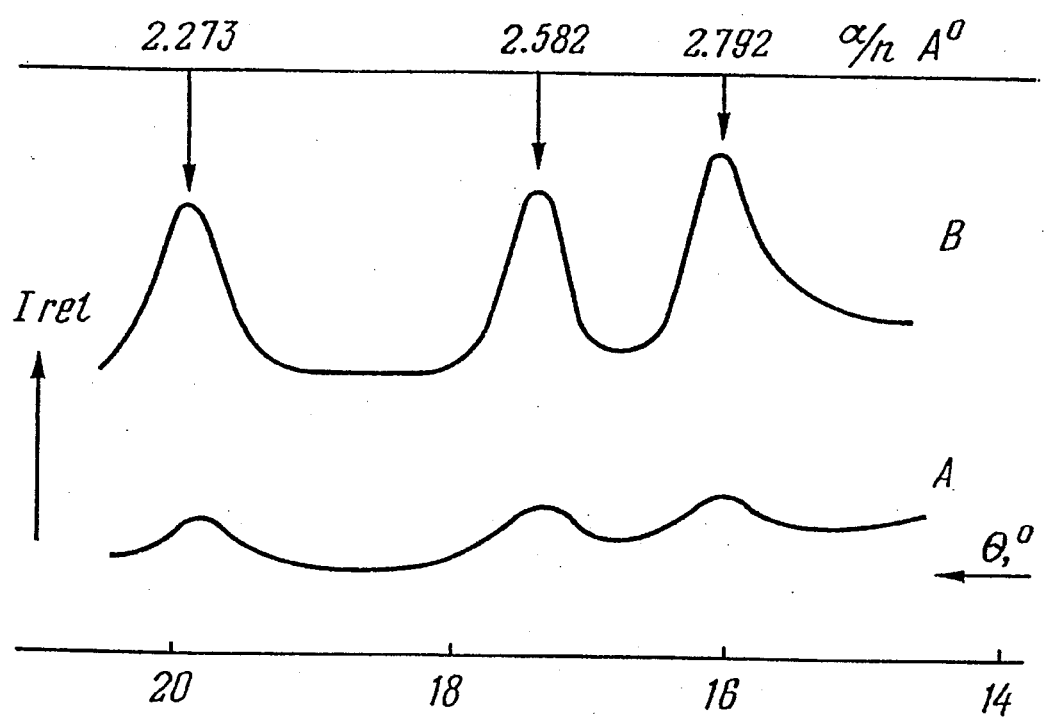

HEAT-ACCUMULATING MATERIAL AND USE THEREOF

This is a continuation of U.S. Ser. No. 08/039,185, filed as PCT/SU91/00173 Aug. 26, 1991, which is now abandoned.

FIELD OF THE INVENTION

The present invention relates to the field of materials for accumulating heat using salt hydrates, and more particularly to a heat-accumulating material containing a thermally stable matrix and salt crystallohydrates as a working substance. As used herein salt crystallohydrates are salts containing bound water of crystallization.

The invention solves the problem of temperature control for gas streams and solid bodies; it is intended for personal use and in technological applications such as conditioning and heating living and working premises and for thermostatically controlling the temperature of articles where heating thereof is undesirable, as well as for extinguishing fires.

PRIOR ART

The most simple and well-known heat-accumulating material is water. The extremely high heat capacity of water (1 cal/g°C.) ensures twice as much heat storage for the same mass in water accumulators as that in accumulators based, for example, on rocky earth. However, volumetrically the difference is diminished due to different densities of water and rock. Hereinbelow it will be shown that when passing to specific heat-accumulating materials such as phase change materials, PCM, the advantage of solid-phase systems becomes still more substantial. The accumulation of heat by solid bodies has been studied and realized in a great number of patents. U.S. Pat. No. 4,708,812 by J. C. Hatfield discloses in detail theoretical and practical problems of heat accumulation in PCM systems based on processes of melting and crystallizing of solid materials.

In such systems substances from the salt crystallohydrates group are used. In Table 1 there are presented reference data on melting temperatures of crystallohydrates.

TABLE 1

Melting points and latent melting heats of some crystallohydrates

| Salt | Melting point °C. | Latent melting heat cal/g | References |
|---|---|---|---|
| $Na_2CrO_4 \cdot 10 H_2O$ | 23 | 39 | Handbook Chemistry and Physics 33 ed., p. 1916–17 Chemical Rubber Publishing Co., Cleveland, Ohio |
| $Na_2SO_4 \cdot 10 H_2O$ | 31 | 51.3 | |
| $Na_2S_2O_3 \cdot 5 H_2O$ | 48 | 47.8 | |
| $Na_2HPO_4 \cdot 10 H_2O$ | 36 | 66.8 | |
| $CaCl_2 \cdot 6 H_2O$ | 29 | 40.7 | |

As clear from the Table, in most cases the melting points noticeably exceed the level of physiologically comfortable temperatures (20° C.). In all the cases the latent melting heat of the salts is not high and enables a small amount of heat per unit of the accumulator working substances (about ten kcal/kg mass) to be stored.

Typical of the prior art is Boardman U.S. Pat. No. 4,277,357, which discloses a composition for heat accumulation close to the claimed one. In said Boardman patent the salt crystallohydrates, in particular $CaCl_2 \cdot 6H_2O$, are distributed in a hydraulically hardening ceramic (cement) matrix.

According to the Boardman patent, the cement matrix is a porous body formed as a result of hydrolysis of cement particles of relatively large sizes (about $10^3$–$10^4$ nm) forming interparticle capillaries of the same order of sizes, and therein salt macroparticles also of the same sizes are crystallized. Having such sizes of pores and particles the cement matrix keeps the salt melt (prevents displacement) due to the capillary forces but does not affect the working heat-accumulating substance properties.

Insofar as this is a typical example of a phase change accumulator (PCM), advantages and disadvantages thereof are characteristic for a great number of patents based on this principle.

An accumulator is an obligatory element of any energy system wherein generation and consumption of energy resources are not synchronized (see W. Twidell, A. D. Weir, Renewable energy resources, London, 1986). The heat system comprises a source (s), an accumulator (a), and a consumer (c). The following relation $t_s > t_a > t_c$ is always valid for this system. Depending on the purpose of a heat accumulator, it is characterized by a number of properties:

1. Accumulation temperature. In a first approximation it may be assumed that the lower the temperature ($t_a$), the higher the accumulator quality (the price is lower and the accessibility of heat being accumulated is higher). However, insofar as $t_a > t_c$ the characteristics of the heat consumers should be taken into account. In view of a great variety of such consumers, $t_a$ is to be a controllable parameter. Of a special interest are accumulation system with an operating temperature of about 20° C., close to a physiologically comfortable one for a human being. Such accumulators can serve as a basis for devices combining functions of a conditioner (cooling air at a temperature over the optimal one) and a heater at a temperature below the optimal one. And in this case the excess heat stored by an accumulator when cooling air, is realized for its heating.

2. Specific energy capacity of an accumulator is also its main characteristic. The amount of heat stored per unit of volume (or mass) of an accumulator substance defines the operating cycle duration, dimensions, and the energy capacity of the apparatus.

3. Time of heat storage. Insofar as natural (climatic) periods of superoptimal and low temperatures are separated in time, it is necessary for an accumulator to be able to keep the stored heat for a long time (hours in case of a daily cycle of operation and many days in case of a seasonal cycle of operation).

4. Stability, non-toxicity, cost. An essential requirement for accumulator substances is their stability in case of a multicycle operation, non-toxicity, availability, and low cost. The combination of these requirements makes it possible to evaluate both the present state of the art and the claimed technical solutions.

Considered hereinbelow are results attained according to the Boardman patent and similar developments from the point of view of the above-mentioned properties of heat accumulators.

1. In heat accumulators based on PCM-systems the problem of temperature control of phase change ($t_a$) has been successfully solved. For that purpose mixtures of salts forming eutectics were employed. For example, according to the Boardman patent it is a mixture of $Na_2SO_4 \cdot 10H_2O$ and $NaCl \cdot H_2O$. By changing the ratio of components in the mixture it is possible to vary $t_a$ from +7° to +22° C.

2. As shown in the Table above, the latent heat of crystallohydrates is rather low (tens of calories per gram), which markedly increases the amount of the required heat-accumulating material and defines the dimensions of heat-accumulating systems.

3. Another consequence of the low energy capacity of conventional PCM materials is a restricted time of storing the accumulated heat. The real time of heat storing is defined by the speed of PCM cooling which depends on the amount of heat accumulated in the material and the heat isolation efficiency. In view of the limited character of both these factors, the duration of heat storing in the accumulator cannot be long.

Accordingly, in terms of the 2 main indices (energy capacity and time of keeping the stored heat) heat-accumulating materials based on PCM do not meet the main requirements. And it is because of these very reasons that a wide practical use of many PCM-systems is limited.

It should be noted here that these disadvantages are caused by the very principle of PCM-systems action and cannot be eliminated by some structural improvements of conventional accumulating systems.

For solving this problem it is necessary to substantially increase (about an order of magnitude) an endothermal effect when accumulating heat. Any endothermal effect is defined by breakage of solid-phase substance particle bonds. Its value depends on the energy of these bonds. In case of PCM-systems there occurs the breakage of most weak intermolecular bonds resulting in a low latent melting heat.

To substantially increase the amount of heat being accumulated, it is necessary to pass to breaking strong intramolecular bonds, for example, dehydration (partial or complete removal of chemically bonded water from salt crystallohydrates) (Table 1).

DESCRIPTION OF THE PRESENT INVENTION

It is an object of the present invention to provide a significant improvement in heat-accumulating materials: an essential increase (order of magnitude) of the energy capacity while increasing the time of storing the accumulated heat.

We now describe the novel systems based on chemical conversions of substances and obtaining the desired materials referred to herein as chemical heat accumulators "CHA".

In the CHA-system the chemical decomposition of a salt as the active ingredient is effected. For instance, in case of $CaCl_2 \cdot 6H_2O$ the reaction is:

$$CaCl_2 \cdot 6H_2O \rightarrow CaCl_2 \cdot 2H_2O + 4H_2O - Q.$$

The decomposition process is endothermal. The heat consumption is associated with water splitting off and subsequently evaporating. It is, naturally, proportional to the number of water moles being split off, the endothermal effect per mole, and the number of moles of active ingredient in volume or weight unit of CHA. For $CaCl_2 \cdot 6H_2O$ this value is readily found.

The endothermal effect, the change of heat of crystallohydrate formation per mole of $H_2O$, is equal on the average, in terms of the cited data, to 74 kcal/mol $H_2O$. Insofar as its own heat of water formation $\Delta H_{H_2O} = -58$ kcal/mol is also involved here, just, the difference of these values 74−58 kcal/mol=16 kcal/mol, i.e. the interaction (binding) energy of water molecule in the crystallohydrate structure/ $Ca(OH_2)_6/^{++}$ is to be taken into account. When removing the split off water, 9 kcal, evaporation heat of a water mole, should be added to this value:

$$Q=16+9=25 \text{ kcal/mol.}$$

The decomposition of each mole (about 220 g of $CaCl_2 \cdot 6H_2O$) is accompanied by isolation of 4 mol of water, thereby giving the total heat effect 25×4=100 kcal/mol of $CaCl_2 \cdot 6H_2O$.

Accordingly, the potentialities of storing heat of CHA-systems exceed, at least, by an order of magnitude those of the conventional PCM-systems (see the Boardman patent).

The dehydration generally occurs at temperatures over the melting points. Thus the reaction $CaCl_6 \cdot 6H_2O \rightarrow CaCl_2 \cdot 4H_2O + 2H_2O$ occurs in the temperature range of 31° to 45° C. which markedly exceed the working temperatures level of a heat accumulator.

To solve the stated problem, it is necessary to substantially decrease the chemical decomposition temperature of thermolabile compounds such as salt crystallohydrates.

According to the present invention this is attained by using so called "size effects", the change of structure and properties of crystalline solid substances when dispersing to microscopic sizes.

It is known in the art that for macroscopic particles wherein the number of atoms increases to infinity, such thermodynamic characteristics as melting point and vapor pressure are constants (T=const at P=const). This rule is violated with sufficiently small particle sizes, for example to $D<10^{-1}$ cm (100 nm). The most reliable data was obtained for changing melting points depending on particle sizes. At small particle sizes, such as D<10 nm, this dependence becomes strong and substantially linear (see, for instance, N. N. Seling, SSP 7, No. 3, 881 (1965). Given hereinbelow is an analytical expression deduced on the basis of experimental data for the dependence of the melting point on a particle radius R:

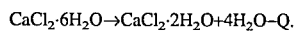

$$T_R = T_o \exp\left(-\frac{2\alpha\Omega}{RQ}\right) \approx T_o\left(1 - \frac{2\alpha\Omega}{RQ}\right)$$

wherein $T_o$ is the melting point of a macrocrystal: (R=∞)

α is the coefficient of surface tension;

Ω is the atomic volume;

Q is the latent heat of melting.

This analytical expression is derived from the Thomson (Kelvin) fundamental equation:

$$\Delta P = \frac{\alpha}{R} \cdot \frac{\Omega}{kT} P_o$$

defining the excess pressure over a drop (particle) of a final size. (see Ya. E. Geguzin, Physics of sintering, "Nauka", M., 1967). The physical sense of the above-mentioned changes of structure and properties of small particles can be interpreted in the first approximation so that a portion of energy spent for dispersing (formation of small particle surface) is accumulated by their three-dimensional structure. This is obvious enough from the fact that in a microparticle a relative portion of surface atoms exhibiting an increased mobility and free energy is high. From the same theoretical relations well experimentally supported it follows that in a wide range of particle sizes (from about 100 nm to 5 nm) "entropic" changes (melting temperature decrease, vapor pressure increase of a substance prevail, whereas "enthalpic" effects such as increase of inter-atomic spacings or decrease of heat of substance formation manifest themselves only at the particle sizes of about 1 to 5 nm (see, for example, the above-cited monograph by Ya. E. Geguzin). We have propounded a hypothesis in terms whereof for any thermolabile crystalline materials in a size range of from 5 to 10 nm there is observed an essential dependence of a chemical decomposition temperature on particle sizes at approximate constancy of heat of formation:

$$t=f(R), \Delta H(R)=\text{const.}$$

Experimental investigations carried out using physical methods (X-ray analysis, calorimetry) have shown that such dependences are actually realized, for example, for the crystallohydrate $CaCl_2 \cdot 6H_2O$ in the range of the salt particle sizes:

$$D=10 \text{ to } 100 \text{ nm } (10^{-6} \text{ to } 10^{-5} \text{ cm}).$$

Given hereinbelow are the main results of changing the decomposition temperature of $CaCl_2 \cdot 6H_2O$ as a function of crystal sizes D (nm):

| | Particle size D, nm | Salt deposition temperature, °C. |
|---|---|---|
| 1. Reference $CaCl_2 \cdot 6H_2O$ | >100 | 29 |
| 2. Sample No. 1 | 50 | ~25 |
| 3. Sample No. 2 | 10 | 13 |

The investigations have shown that the decrease of a salt particles size is accompanied by the change of not only the temperature but also the decomposition mechanism of a crystallohydrate. It is known from the literature that the crystallohydrate $CaCl_2 \cdot 6H_2O$ in the temperature range of from 31° to 45° C. decomposes to $CaCl_2 \cdot 4H_2O$ while splitting off 2 molecules of water, then in the range of from 50° to 60° C. transition to $CaCl_2 \cdot 2H_2O$ occurs with splitting off 2 more moles of water. The process is reversible: under the conditions of temperature lowering and humidity increasing $CaCl_2 \cdot 2H_2O$ is fully converted into the starting hexahydrate $CaCl_2 \cdot 6H_2O$. This working process was used as a basis for developing the presently claimed CHA-material.

When realizing the process, natural difficulties arise: it is practically impossible to handle microscopic size particles (less than 100 nm).

Moreover, such energy-rich non-equilibrium systems are readily caked to give macroparticles ($R=\infty$). To solve this problem, we have used a step of placing salt particles into a porous ceramic matrix. The porous matrix used by us, for example made of silica (silica gel), as distinct from the Boardman patent, has pores of the required sizes (10–50 nm) wherein salt particles of the same (microscopic) sizes are crystallized.

Accordingly, per 1 kg of a crystallohydrate active ingredient, such as $CaCl_2 \cdot 6H_2O$ having particle sizes D<100 nm, the energy store is about 450 kcal/kg salt. When using silica gel with pore volume of about 1 cm$^3$/g, i.e. 0.5 l pores per 1 l of bulk volume, and the crystallohydrate density of 1.7 g/cm$^3$, the energy store per 1 l of the bulk volume of the CHA material granules is 400 kcal/l.

In view of a great number of conventional compounds of a crystallohydrate type, the selection possibilities are defined by the following factors:

(a) For a great number of conventional crystallohydrates the enthalpy of formation per mole $H_2O$ is approximately constant and agrees with the binding energy change in the range H 16±2 kcal/mol $H_2O$;

(b) The most important requirement for the active ingredient is its stability under multiple hydration/dehydration cycles. The main limitation here is associated with the salt partial hydrolysis possibility when decomposing the crystallohydrate. Such stability is inherent, first of all, in strong acids and bases. When proceeding to elements forming amphoteric oxides and hydroxides, the isolation of acid occurs. The employment of salts of thermolabile acids (nitric, acetic, oxalic, etc.) is also limited;

(c) Non-toxicity of a salt;

(d) Availability.

In terms of the sum of the above-mentioned requirements, $CaCl_2 \cdot 6H_2O$ is preferably useful as characterized by a thermochemical stability, high energy-storing of a substance due to isolation of 4 moles of water per mole of salt, non-toxicity, and availability (calcium chloride is a main by-product of the soda production by the Solvay process the utilization of which by-product is a problem).

In practice as a matrix for the selected crystallohydrates use is made of a matrix in the form of granulated or powdery or porous particles of 1 to 5,000 microns in size of inorganic, polymer, carbon or metal materials wherein the prevailing pore volume portion is presented by pores of the required sizes (less than 100 nm). To such materials belong porous glasses and similar ceramic materials, porous metals and polymers, active carbon, and other fine-porous matrices.

For the realization of potentialities of CHA-systems it is highly important to use so-called "open systems" wherein the exchange with the environment both as per heat and substance (moisture) takes place.

By their purpose and significance any heat-accumulating systems are open as concerns heat, insofar as the heat exchange with the environment is an obligatory condition for any application of heat-accumulators.

If a heat accumulator is charged with humid air ($\alpha=100\%$) by cooling air from 20° to 10° C., the amount of heat absorbed is 1.5 times more because of heat of condensation than when lowering the temperature by the same 10° C. Accordingly, in case of humid air the main energy potential is associated with the moisture contained in that air. The presence in air at temperatures over 0° C. of considerable amounts of water vapor (moisture evaporation is the main way of utilizing the solar energy in the nature) and a relative simplicity of controlling the air humidity define a specific efficiency of using hygroscopic thermosensitive materials, in particular salt crystallohydrates disclosed in the instant application, as working substances in the heat-accumulating systems. To realize the "open" moisture exchange processes between CHA-materials and a gaseous atmosphere it is essential that the pores wherein the thermosensitive hygroscopic material resides be "open" and easily communicate with the gaseous (air) atmosphere.

The heat energy is stored in CHA-materials in the form of potential energy of a reactive chemical system. As distinct from PCM-systems, CHA-materials can have any temperature (generally it is equal to the ambient temperature). However, even at t<t of the environment no "self-discharge" of CHA-materials can occur. Both the accumulation and liberation of heat are associated with changes of the system chemical composition. Therefore the liberation of the accumulated heat will not take place until there is an efficient contact between the material and the reagent, water vapor. In the absence of such a contact the accumulated energy can be stored in a CHA-system for an unlimited period of time.

The realization of the CHA-systems solves 2 main problems limiting a wide use of in principle promising systems for accumulating heat energy based on salt crystallohydrates: the increase of energy capacity and time of heat storing.

Thus, the claimed CHA-materials based on $CaCl_2 \cdot 6H_2O$ crystallohydrate are characterized by very high energy capacities as to heat accumulation, their working temperature levels being close to the optimal ones (comfortable temperature). Such a unique combination of properties (high energy capacity at low temperatures) permits a rather wide spectrum of fields of application of the CHA-materials in conventional and novel technologies where there is required a rapid and efficient heat removal from air or a heating of some parts under working conditions.

The main effect on which the proposed process is based, lowering the substance decomposition temperature when decreasing the salt particles sizes to microscopic ones (less than 100 nm) only partially depends on both the nature of the salt and of the porous matrix. Of essential significance is only the absence of a specific chemical interaction between the thermosensitive active ingredient and the matrix material. Thus, for example, the opportunities of using zeolites, wherein the potential ion exchange between the matrix and a thermosensitive active ingredient is very high, are limited.

The direction and rate of the main working process of a CHA-material are described by the following reversible thermochemical reaction:

$$CaCl_2 \cdot 6H_2O \rightleftharpoons CaCl_2 \cdot 2H_2O + 4H_2O - Q.$$

The equilibrium state in the system depends not only on the temperature, but also on the ambient humidity. Therefore, the air humidity is the second important factor in controlling heat accumulation and removal in CHA-materials. Using a CHA-material according to the present invention there has been developed a device intended for maintaining in a closed area a comfortable (optimal physiological) temperature, generally 20°±2° C. Such a device which combines functions of a conditioner and a heater is called by us as "Comforter". The Comforter action is based on a reversible thermochemical cycle of storing and consuming a low-potential heat energy in a chemical heat accumulator (CHA-system). The absence of an autonomous energy source, such as a thermocompressor in a conditioner restricts the Comforter capabilities. This energy-storing technology is intended for temperature control in small premises (about 50 m³), and in case of closed spaces—on the absence of an inflow of hot or cold air from the outside. However, such advantages of the Comforter as simplicity, safety, minimum energy consumption, and ecological purity (absence of freon) make it appealing to mass consumers.

The unique property of the CHA-materials, the capability of accumulating a large amount of heat (up to 1 kcal/cm³) at a temperature close to room one considerably widens the scope of possible applications of such substances in the technology. In the instant application along with the main purpose, i.e. the air temperature control in premises (Comforters) there are proposed 2 non-traditional purposes of using heat-accumulating materials:

1. Cooling parts and devices which are heated under working conditions. This problem is urgent for a wide range of technical systems, first of all for elements of radio electronic apparatus in electronic computers and various electronic equipment, as well as for protecting building constructions in case of fire.

2. Another non-traditional but logically following from the CHA-materials unique properties trend in the application thereof is for extinguishing fire, for suppressing a non-controllable burning process.

A CHA-material capable of accumulating about 1 kcal per gram in the temperature range of from 20° to 40° C. is an effective antipyrene a minimum amount of which can extinguish any fire.

Hydrated forms of zeolites capable of effective heat absorption under heating to temperatures of 80° to 100° C. and over and are very close to the CHA-materials in their properties for such uses in liberating the absorbed moisture to the environment.

Accordingly, for protecting articles and building constructions against overheating, as well as for fire extinguishing, according to the present invention, it is also possible to use hydrated forms of zeolites or mixtures thereof with CHA-materials. In a number of cases it is preferable in view of cheapness of natural zeolites.

The process for producing CHA-materials is based on a number of traditional operations: impregnation of the matrix with a salt solution, removal of the solvent while crystallizing the salt crystallohydrate.

The other purposes and advantages of the instant invention will be illustrated by the following Examples of specific embodiment thereof and the Figure showing fragments of radiograms obtained for samples produced according to the instant invention. The position of lines correspond to the synthesized phase of $CaCl_2 \cdot 6H_2O$. Owing to small sizes of crystallites (about 100 Å) the diffraction lines are broadened.

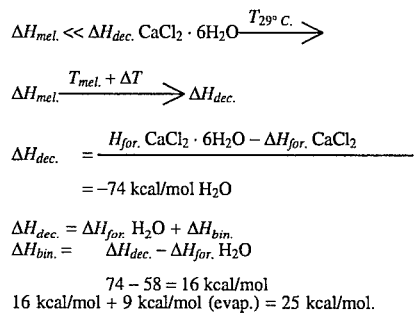

PREFERRED EMBODIMENTS OF THE INVENTION

Given hereinbelow are Examples A and B (see Figure) illustrating the CHA-material preparation.

EXAMPLE A 1 kg of granulated silica gel (granules of 3–7 μm) having about 1 cm³/g pores of 10 to 15 nm in diameter was impregnated with 1000 ml of 40% $CaCl_2$ solution. Then the impregnated mass was dried and calcined at a temperature of 240° C. till the complete solvent (water) removal and formation of anhydrous salt in the matrix pores. Then after cooling the material was hydrated to the crystallohydrate of $CaCl_2 \cdot 6H_2O$ salt by holding in a damp atmosphere, with the process course being controlled in terms of sample weight change.

EXAMPLE B 1 kg of silica gel powder dispersed to 1 to 100 μm having a total volume of pores of 2.8 cm³/g with a prevailing pore diameter of 10 to 15 nm, was impregnated with 2800 ml of 40% $CaCl_2$ solution, then, following the procedure of Example A, the impregnated mass was fired and calcined. Thereafter the mass was reimpregnated with the same solution as to moisture capacity, redried, calcined, and hydrated in a damp atmosphere till obtaining a salt crystallohydrate of the $CaCl_2 \cdot 6H_2O$ composition. The fragments of radiograms presented in the Figure correspond to samples of the materials obtained in Examples A and B. They show that crystals of the $CaCl_2 \cdot 6H_2O$ phase were actually formed within the matrix pores.

Examples 1 to 4 given hereinbelow illustrate the compositions with various sizes of the $CaCl_2 \cdot 6H_2O$ salt crystalline particles and different degrees of the matrix pores being filled with the active ingredient.

EXAMPLE 1

A heat-accumulating material comprising $CaCl_2 \cdot 6H_2O$ crystals with an average size of 50 nm. The material comprises 400 g (about 2 ml crystallohydrate per 1 l bulk volume of the matrix) (granules of 3–7 mm in diameter). According to the calculated estimation (see above) energy storing of such an accumulator is about 200 kcal/l bulk volume or about 300 kcal/l actual volume, without account of voids in the stack of granules. The experimentally determined conversion temperature $t_a = 25° \pm 1°$ C. at a relative humidity $\alpha = 65\%$.

EXAMPLE 2

A heat-accumulating material consisting of $CaCl_2 \cdot 6H_2O$ with a particle size of 10 to 15 nm. The material 400 g/ about 2 mol crystallohydrate per 1 l matrix bulk volume. The energy capacity of this heat-accumulating material is also 200–300 kcal/l of the bulk or actual volume of the material, respectively. The temperature of salt decomposition (at a relative humidity of the environment $\alpha = 65\%$) is 13.5° C.

EXAMPLE 3

A heat-accumulating material consisting of $CaCl_2 \cdot 6H_2O$ crystals of a size D=10 to 15 nm. The temperature of salt decomposition, as in Example 2, is 13.5° C., however the salt content is 800 g per 1 l bulk volume. Accordingly the energy capacity of 1 l of the material is 400 to 600 kcal/l.

EXAMPLE 4

A heat-accumulating material similar to that described in Examples 2 and 3, but distinct in that instead of a granulated silica gel with a limited porosity (about 1 cm³/g) use is made of a high-porous powder with pores of the same size but the total porosity of 2.8 cm³/g. Due to a considerable increase of porosity that is a powdery heat-accumulating material comprising 1.53 kg $CaCl_2 \cdot 6H_2O$ per 1 l volume. At the same accumulation temperature (13° C.) the energy capacity of the sample is 700 kcal/l.

Given hereinbelow are Examples 5 to 8 illustrating the use of CHA-systems for the air temperature control.

EXAMPLE 5

To a vertical cylindrical heat-insulated reactor charged with 1 l of a CHA-material in the form of granules $\alpha=3$ to 7 mm with energy capacity of about 500 kcal/l bulk volume (see Example 3) was fed dry air in an amount of 1 m³/h with steam content of less than 1 g/m³. At the inlet temperature of dry air of 15° to 20° C. in consequence of adiabatic cooling at the crystallohydrate decomposition, the air temperature decreased in the CHA layer, and at the reactor outlet was 0°–+5° C. ($\Delta t = -15°$ C.), the air moisture content increasing to 4 g/m³ which is close to $\Delta = 100\%$ at $t = +5°$ C. The practical importance of such a simple and ecologically pure method of obtaining domestic cold is obvious (the temperature range 0° to +5° C. corresponds to the operation temperature level in a domestic refrigerator). It is expedient to use highly humid cooled air for storing vegetables and other similar products. As distinct from the refrigerator, the presently described system requires no Freon and reduces energy consumption 10 times (instead of a compressor for Freon, just a low-power fan is required for drawing air through the CHA-material layer). Additional energy consumption may be associated with obtaining dry gas, however effective technical solutions are known for this too.

EXAMPLE 6

The procedure of Example 5 was repeated, except that a 1 m³/h air having $t_{init.} = 30°$ C., $\alpha = 50\%$, bulk speed 1000 l/h was blown through the granules of CHA-material. When contacting air with the granules, the crystallohydrate dehydration with heat absorption occurred. Due to the heat exchange with the granules the air was cooled to +20° C. while the absolute humidity increased by 2 g/m³. The experimental working cycle time (about 200 h) was close to the calculated one at the given energy capacity (500 kcal/l granules).

EXAMPLE 7

The procedure of Example 6 was repeated, except that the air flow was increased to 2 m³/h (bulk speed 2000 l/h). The chemical heat accumulator ensured for 200 h the air cooling from +25° C. at the inlet to +20° C. at the outlet.

Examples 5, 6 and 7 illustrate the accumulator charging cycle (dehydration) with heat absorption. Example 8 describes the reverse process.

EXAMPLE 8

The same reactor as in Examples 5–7 was used, however the CHA-material granules charged into the reactor contained the active ingredient in a dehydrated form ($CaCl_2 \cdot 2H_2O$). When passing damp ($\alpha = 50$ to 60%) air with the initial temperature of +15° C., the hydration (discharging) of the accumulator occurred. The temperature of air at the outlet was +25° C., the absolute humidity was lowered by 1 g/m.

Examples 9 to 12 illustrate the main ways of solution and the results of using such a method.

The process was studied on a model laboratory apparatus, a part to be protected against heating (flat metal plate) was put into contact with an electrically heated plate of the same size (6×6=36 cm²). When passing current through the latter plate (0.05 W/cm² s) it was heated and the heat was transferred to the test plate of the same area and 2 mm thick. On the opposite side of the test plate there was applied an epoxy layer containing as a filler disperse CHA-material powder (less than 100μ), such as that described in Example 4 of the present application.

EXAMPLE 9

A control test wherein the resin coating and CHA-material were not applied. Upon passing electric current for 1 h the lower plate temperature attained 95° C. (heating up 95°–20°=75° C.).

EXAMPLE 10

The procedure of Example 9 was repeated, except that onto a free (non-contacting with the electric heater) side of the plate there was applied a layer of CHA-material powder slurry in epoxy of 1 mm in thickness (about 0.1 cm$^3$ powder per cm$^2$ plate). Upon passing electric current for 1 h, the test plate retained the temperature close to the initial one (room), 20° to 30° C.

EXAMPLE 11

The procedure of Example 10 was repeated, except that the heat-accumulating coating thickness was increased to 3 mm (about 0.25 cm$^3$ powder per 1 cm$^2$ plate). Such coating ensured the temperature retention at 20° to 30° C. for 2 h.

EXAMPLE 12

The procedure of Examples 10 and 11 was repeated, except that the heat-accumulating coating thickness was increased to 5 mm (about 0.4 cm$^3$ powder per 1 cm$^2$ plate surface). The coating ensured the plate temperature retention in the range of from 2° to 40° C. for 4 h.

As follows from Examples 9 to 12, the use of the synthetic resin with the filler, CHA-material powder, is an effective method for heat removal from metal and other surfaces being heated under working conditions, while the effective heat accumulation by the filler, CHA-material powder, ensures the retention of temperatures at a much lower level than the temperature of polymer binder destruction (about 100° C. for epoxy). The compositions employed in Examples 10 to 12 consisted of a disperse (less than 100µ) CHA powder and epoxy. The high adhesion between the resin and silica, the CHA matrix porous substance, makes it possible to prepare compositions with a high content (up to 80% by weight) of the heat-accumulating material. The employment of epoxy in such compositions is quite justified, insofar as it combines valuable properties such as high electric resistivity and satisfactory thermal conductivity which are necessary for heat transfer from the heated surface to the CHA-material powder.

The use of CHA-materials for fire extinguishing is illustrated by Examples 13 to 15.

EXAMPLE 13

Into a flat cylindrical vessel of 5 cm in diameter and 1 cm high were fed 2.5 cm$^3$ of kerosene (layer of about 1 mm) and set on fire. Under the selected conditions the time of kerosene burning out was about 200 s which correspond to the calculated heat liberation of 125 cal/s or 2000 cal/8 s. The burning was stable, and the sample burning out time was reproducible of 200±10 s in the repeated runs series.

EXAMPLE 14

The procedure of Example 13 was repeated, except that 50 s after setting fire, the kerosene stable flame tongue was spread with a CHA-material powder having a high energy capacity (see Example 4). The fire was completely extinguished upon feeding about 1 g powder (feeding time about 10 s). However in view of the powder disperse state, a considerable portion thereof was brought out of the burning area and deposited on the periphery (outside the vessel). This apparently increases the consumption of antipyrene.

EXAMPLE 15

The procedure of Examples 13 and 14 was repeated, except that the CHA-material was broken up into particles of 1 to 3 mm in diameter. Such particles had a sufficient mass to penetrate into the burning kerosene area. The CHA-material consumption was about 0.3 g, which apparently agreed with the actual consumption of antipyrene when extinguishing fire.

Accordingly, to effectively employ the CHA-material for fire extinguishing, it is necessary to ensure feeding thereof to the burning surface at a rate of about 0.3 kg/1000 kcal liberated heat.

It should be stressed that the CHA-materials possess the above-mentioned properties only in the discharged (hydrated) form. Therefore it is necessary to ensure such storing conditions (temperature, tightness) which prevent non-controllable (spontaneous) decomposition (dehydration).

The presently claimed material is advantageously distinct from many similar substances in efficiency, compactness, and no liberation of any toxic substances under heating.

The most efficient method of using a solid-phase antipyrene of the proposed type is a mechanical introduction thereof onto the burning material surface, the least stable fire area where minimum actions may give the most considerable result. According to Examples 13 to 15 the antipyrene dose required for fire extinguishing is 0.15 to 0.5 kg per 1 m$^2$ burning surface, which is close to the best kinds of antipyrene known in world practice.

Apparently the use of the novel antipyrene is most efficient for fire extinguishing in almost inaccessible regions, for example forest fires, as well as fires on transport.

GENERAL ESTIMATION OF EFFICIENCY

The presently claimed heat-accumulating material has 2 significant distinctions from the conventional phase-change accumulators:

The energy capacity is about 10 times as highs

The time of storing the accumulated energy is practically non-limited.

These qualitative distinctions make it possible to solve novel technical problems which were previously non-pursued when developing solid-phase heat-accumulating substances and compositions:

1. To arrange a universal "seasonal" cycle of heat supply for houses with conditioning in summer and heating in winter using heat accumulated in the accumulator substance. Such cycle is practicable and efficient for a great number of regions having a temperate climate.
2. To solve a temperature control problem on a qualitatively new basis, which is especially important for high-speed computers and a wide range of electronic devices. High-efficiency compact heat removal systems made of polymeric resin with a CHA filler can markedly simplify the design and increase the reliability of electronic devices.
3. The use of the CHA materials for fire extinguishing makes it possible to drastically decrease the need in antipyrenes, which is especially important in case of forest fires in inaccessible regions as well as fires in transports.

What is claimed is:

1. A heat-accumulating material comprising a thermally stable, porous matrix having an outer surface containing open pores and having impregnated in said open pores of said porous matrix a thermosensitive active ingredient having reversible dehydration/hydration with a gaseous atmosphere thereby absorbing heat during dehydration or giving off heat during hydration, said porous matrix being in the form of granulated or powdery porous particles of 1 to 5,000 µm in size of inorganic, polymer, carbon or metal materials having open pores of less than 100 nm in size, said active ingredient being a crystallohydrate having the ability of releasing chemically bound water during said dehydration or absorbing chemically bound water during said hydration, and the pores of said thermally stable matrix being open to the surrounding atmosphere at the outer surface of said matrix and enabling the active ingredient contained in and communicating with said pores and exposed to the gaseous atmosphere to exchange water vapor with the surrounding gaseous atmosphere during said dehydration/hydration.

2. A heat-accumulating material according to claim 1, wherein the pores of the thermally stable matrix being sufficiently small that the maximum crystalline size of the crystallohydrates which have been formed in said pores causes the temperature of chemical conversion of the crystallohydrate so as to lose or gain bound water of crystallization to be below the melting point of the crystallohydrate in one of its crystalline forms containing water of hydration.

3. A heat-accumulating material according to claim 2, in which the crystallohydrate is stable under multiple hydration/dehydration cycles.

4. A heat-accumulating material according to claim 3, in which the salt crystallohydrate is the salt of a strong acid and a strong base.

5. A heat-accumulating material according to claim 4, in which the salt crystallohydrate is calcium chloride containing water of crystallization.

6. A heat-accumulating material according to claim 5, in which the salt crystallohydrate is $CaCl_2 \cdot 6 H_2O$.

7. A heat-accumulating material according to claim 2, wherein the salt crystallohydrates are less than 100 nm in size.

8. A heat-accumulating material according to claim 2, in which the pores of the thermally stable matrix are of a size of 10–50 nm.

9. A heat-accumulating material according to claim 8, in which the pores are about 10 nm in diameter.

10. A heat-accumulating material comprising a thermally stable, porous matrix having an outer surface containing open pores and having impregnated in said open pores of said porous matrix a thermosensitive active ingredient having reversible dehydration/hydration with a gaseous atmosphere thereby absorbing heat during dehydration or giving off heat during hydration, said active ingredient comprising calcium chloride having chemically bound water of crystallization, said thermally stable, porous matrix being in the form of granulated or powdery porous particles of 1 to 5,000 µm in size of inorganic, polymer, carbon or metal materials having open pores of less than 100 nm in size.

11. A heat-accumulating material according to claim 10, in which the hydrated calcium chloride includes $CaCl_2 \cdot 6 H_2O$.

12. A heat-accumulating material according to claim 10, in which the pores have sizes within the range of 10–50 nm.

13. A method of maintaining temperature control within a gaseous atmosphere in a confined space, said gas atmosphere being subject to temperature fluctuations, which comprises placing a heat accumulating material as defined in claim 1 in said atmosphere, said heat-accumulating material being chosen so that the temperature at which the reversible dehydration/hydration of the thermosensitive active ingredient takes place is proximate a desired temperature for said gaseous atmosphere.

14. A coated article subject to heating above a desired of temperature, said article having as a coating on a surface thereof of a heat-accumulating material according to claim 1.

15. A method for extinguishing a fire, which comprises introducing into the flames of the fire a heat-accumulating material according to claim 1 broken up into particles having a sufficient mass to penetrate the fire.

* * * * *